(12) United States Patent
Xu

(10) Patent No.: US 12,501,403 B2
(45) Date of Patent: Dec. 16, 2025

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Weijie Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 396 days.

(21) Appl. No.: 18/145,634

(22) Filed: Dec. 22, 2022

(65) Prior Publication Data

US 2023/0199716 A1 Jun. 22, 2023

Related U.S. Application Data

(63) Continuation of application No. PCT/CN2020/104890, filed on Jul. 27, 2020.

(51) Int. Cl.
*H04W 68/02* (2009.01)
*H04W 72/23* (2023.01)

(52) U.S. Cl.
CPC ........... *H04W 68/02* (2013.01); *H04W 72/23* (2023.01)

(58) Field of Classification Search
CPC ..... H04W 68/02; H04W 72/23; H04W 88/02; H04W 88/08; H04W 52/0229; H04W 52/0235; H04W 52/028; H04W 68/00; H04W 52/0216; H04W 4/70; H04W 72/30; Y02D 30/70; H04L 25/0224
See application file for complete search history.

(56) References Cited

U.S. PATENT DOCUMENTS

| 8,660,064 B2 | 2/2014 | Lee et al. | |
| 9,491,734 B2 | 11/2016 | Lee et al. | |
| 9,681,416 B2 | 6/2017 | Lee et al. | |
| 2004/0087320 A1* | 5/2004 | Kim | H04W 72/30 370/335 |
| 2011/0051668 A1 | 3/2011 | Lee et al. | |
| 2013/0201840 A1* | 8/2013 | Sorrentino | H04L 25/0224 370/252 |
| 2014/0192720 A1 | 7/2014 | Lee et al. | |
| 2017/0013593 A1 | 1/2017 | Lee et al. | |
| 2017/0331639 A1* | 11/2017 | Quan | H04W 72/23 |

(Continued)

FOREIGN PATENT DOCUMENTS

| CN | 101946548 A | 1/2011 |
| CN | 110830225 A | 2/2020 |
| CN | 110831125 A | 2/2020 |
| CN | 110875811 A | 3/2020 |

(Continued)

OTHER PUBLICATIONS

Oppo, "Stopping criteria for paging monitoring", 3GPP TSG-RAN WG2 Meeting #109 electronic R2-2000418, Feb. 24-Mar. 6, 2020. 2 pages.

(Continued)

*Primary Examiner* — Kiet Tang
(74) *Attorney, Agent, or Firm* — PERKINS COIE LLP

(57) ABSTRACT

Provided are a wireless communication method, and a device. The method comprises: a terminal device receiving an indication signal indicating whether a paging message is to be received by the terminal device. In the method, whether a paging message is to be received by a terminal device is indicated by means of indication information.

20 Claims, 5 Drawing Sheets

(56) References Cited

U.S. PATENT DOCUMENTS

| | | | |
|---|---|---|---|
| 2019/0174529 A1* | 6/2019 | Tie | H04W 4/70 |
| 2019/0239189 A1 | 8/2019 | Hwang | |
| 2020/0169956 A1 | 5/2020 | Sun | |
| 2021/0144641 A1 | 5/2021 | Sun | |
| 2021/0153163 A1 | 5/2021 | Hwang | |
| 2022/0124619 A1 | 4/2022 | Sun | |

FOREIGN PATENT DOCUMENTS

| | | |
|---|---|---|
| CN | 111200870 A | 5/2020 |
| CN | 111356216 A | 6/2020 |
| EP | 3509368 A1 | 7/2019 |

OTHER PUBLICATIONS

International Search Report in the international application No. PCT/CN2020/104890, mailed on Apr. 19, 2021. 7 pages with English translation.

Written Opinion of the International Search Authority in the international application No. PCT/CN2020/104890, mailed on Apr. 19, 2021. 8 pages with English translation.

Samsung, "Corrections on UE power savings", 3GPP TSG-RAN WG1 Meeting #100bis-e R1-2003177, e-Meeting, Apr. 20-30, 2020. 5 pages.

3GPP "3rd Generation Partnership Project; Technical Specification Group Radio Access Network; NR; Study on UE Power Saving (Release 16)", TR 38.840 V2.0.0, Technical Report, (May 2019). 73 pages.

Nokia et al: "UE-group wake-up signal for MTC", 3GPP Draft; R1-1808430, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 10, 2018 (Aug. 10, 2018), pp. 1-3, XP051515812, p. 1, lines 14-17; p. 2, lines 18-20. 3 pages.

Supplementary European Search Report in the European application No. 20947407.1, mailed on Aug. 29, 2023. 12 pages.

* cited by examiner

WIRELESS COMMUNICATION METHOD, TERMINAL DEVICE AND NETWORK DEVICE

CROSS REFERENCE TO RELATED APPLICATION

The present application is a continuation application of International Patent Application No. PCT/CN2020/104890 filed on Jul. 27, 2020, disclosure of which is hereby incorporated by reference in its entirety.

BACKGROUND

When a terminal device is in a Radio Resource Control (RRC) connected state, an energy saving signal may be sent before a Discontinuous Reception (DRX) cycle. If the terminal device has no data transmission within the DRX cycle, the energy saving signal may be configured to indicate the terminal device not to monitor a Physical Downlink Control Channel (PDCCH) within a DRX ON-duration. Therefore, by receiving the energy saving signal, the terminal device may not monitor the PDCCH for a period of time, so as to achieve the purpose of energy saving gain.

However, there may be a large number of terminal devices in an RRC idle or RRC inactive state in a network. When the terminal device is in the RRC idle or RRC inactive state, the terminal device needs to continuously monitor a paging message according to the cycle of the paging message, but the terminal device is paged only after having services occasionally. Therefore, the terminal device has no corresponding paging message for monitoring the paging message most of the time, which objectively has space for power consumption optimization.

Therefore, how to avoid monitoring the paging message when the terminal has no paging message to save energy is a problem urgent to be solved.

SUMMARY

A wireless communication method, and a device are provided. If there is no paging message, a terminal device may avoid monitoring the paging message to save energy, thereby reducing power consumption of the terminal device.

In a first aspect, there is provided a wireless communication method, which may include the following operation. A terminal device receives an indication signal, the indication signal being configured to indicate whether the terminal device receives a paging message.

In a second aspect, there is provided a wireless communication method, which may include the following operation. A network device sends an indication signal, the indication signal being configured to indicate whether a terminal device receives a paging message.

In a third aspect, there is provided a terminal device including a transceiver, configured to receive an indication signal, the indication signal being configured to indicate whether the terminal device receives a paging message.

In a fourth aspect, there is provided a network device including a transceiver, configured to send an indication signal, the indication signal being configured to indicate whether the terminal device receives a paging message.

DETAILED DESCRIPTION

The technical solutions in the embodiments of the present disclosure will be described below in combination with the drawings in the embodiments of the present disclosure. It is apparent that the described embodiments are not all embodiments but part of embodiments of the present disclosure. All other embodiments obtained by those of ordinary skill in the art based on the embodiments in the present disclosure without creative work shall fall within the scope of protection of the present disclosure.

Figure 1:
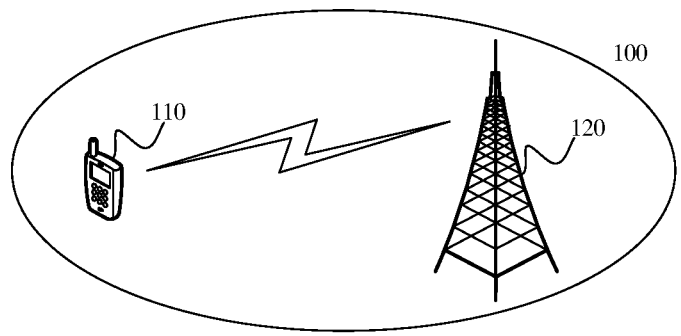
FIG. 1 is an example of an applicable scenario of the present disclosure.

FIG. 1 is a schematic diagram of an application scenario according to an embodiment of the present disclosure.

As shown in FIG. 1, the communication system 100 may include a terminal device 110 and a network device 120. The network device 120 may communicate with the terminal device 110 through an air interface. Multi-service transmission is supported between the terminal device 110 and the network device 120.

It is to be understood that only the communication system 100 is exemplarily described in the embodiments of the present disclosure, but there are no limits made thereto in the embodiments of the present disclosure. That is, the technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, LTE Time Division Duplex (TDD), a Universal Mobile Telecommunication System (UMTS), a Worldwide Interoperability for Microwave Access (WiMAX) communication system, a New Radio (NR) or a future 5G system.

Taking a 5G system as an example, the technical solutions in the embodiments of the present disclosure may be applied to wide-area LTE coverage and an NR island coverage manner. A lot of LTE is deployed below 6 GHz, and there are few spectra below 6 GHz available for 5G. Therefore, NR must study spectrum application above 6 GHz, while the coverage of high frequency band is limited and the signal fading is fast. At the same time, in order to protect early investment of mobile operators in LTE, a working mode of tight interworking between LTE and NR is proposed.

The main application scenarios of 5G include: Enhanced Mobile Broadband (eMBB), Ultra-Reliable and Low Latency Communication (URLLC), and massive Machine Type of Communication (mMTC). Herein, the eMBB aims at enabling a user to obtain multimedia content, services and data, and its demand is growing rapidly. The eMBB may be deployed in different scenarios. For example, indoor, urban, rural, and the like. The differences in capabilities and needs are large, which may not be generalized, and may be analyzed in detail in combination with specific deployment scenarios. Typical applications of URLLC include industrial automation, power automation, remote medical operation, traffic safety guarantee and the like. Typical features of mMTC include: high connection density, small data volume, delay-insensitive services, low cost and long service life of modules and the like.

In addition, since complete 5G NR coverage is difficult to obtain, the network coverage in the embodiments of the present disclosure may adopt the wide-area LTE coverage and the NR island coverage manner. At the same time, in order to protect early investment of the mobile operators in LTE, a working mode of tight interworking between LTE and NR is further used.

In particular, the technical solutions of the embodiments of the present disclosure may be applied to various communication systems based on a non-orthogonal multiple access technology, for example, a Sparse Code Multiple Access (SCMA) system, a Low Density Signature (LDS) system, and the like. Of course, the SCMA system and the LDS system may also be referred to as other names in the field of communication. Furthermore, the technical solutions of the embodiments of the present disclosure may be applied to a multi-carrier transmission system adopting the non-orthogonal multiple access technology, for example, Orthogonal Frequency Division Multiplexing (OFDM), Filter Bank Multi-Carrier (FBMC), Generalized Frequency Division Multiplexing (GFDM), Filtered-OFDM (F-OFDM) systems, and the like.

In the communication system 100 shown in FIG. 1, the network device 120 may be an access network device communicating with the terminal device 110. The access network device may provide communication coverage for a specific geographical region and may communicate with the terminal device 110 (such as User equipment (UE)) located in the coverage.

Optionally, the network device 120 may be a Base Transceiver Station (BTS) in the GSM or the CDMA system, may also be a NodeB (NB) in the WCDMA system, and may further be an Evolutional Node B (eNB or eNodeB) in the LTE system. Optionally, the network device 120 may be a Next Generation Radio Access Network (NG RAN), or a gNB in the NR system, or a wireless controller in a Cloud Radio Access Network (CRAN). Or the access network device may be a relay station, an access point, a vehicle device, a wearable device, a hub, a switch, a network bridge, a router, a network device in a future evolved Public Land Mobile Network (PLMN) or the like.

Optionally, the terminal device 110 may be any terminal device, and includes, but not limited to, a device configured to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another terminal, and/or an Internet of Things (IoT) device. The terminal device configured to communicate through a wireless interface may be referred to as a "wireless communication terminal", a "wireless terminal" or a "mobile terminal". Examples of the mobile terminal include, but not limited to, a satellite or cellular telephone, a Personal Communications System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, Device to Device (D2D) communication may be performed between the terminal devices 110.

A network device and a terminal are exemplarily shown in FIG. 1. Optionally, the communication system 100 may include multiple network devices and another number of terminal devices may be included in coverage of each network device. There are no limits made thereto in the embodiments of the present disclosure.

Optionally, the communication system 100 may further include another network entity such as a network controller and a mobility management entity. No limits are made thereto in the embodiments of the present disclosure.

It is to be understood that a device with a communication function in the network/system in the embodiments of the present disclosure may be referred to as a communication device. Taking the communication system 100 shown in FIG. 1 as an example, communication devices may include the network device 120 and the terminal device 110 with the communication function, and the network device 120 and the terminal device 110 may be the specific devices mentioned above and will not be elaborated herein. The communication devices may further include other devices in the communication system 100, for example, other network entities like a network controller and a mobility management entity. There are no limits made thereto in the embodiments of the present disclosure.

It is to be understood that terms "system" and "network" in the present disclosure may usually be exchanged in the present disclosure. In the present disclosure, term "and/or" is only an association relationship describing associated objects and represents that three relationships may exist. For example, A and/or B may represent three conditions: i.e., independent existence of A, existence of both A and B and independent existence of B. In addition, character "/" in the present disclosure usually represents that previous and next associated objects form an "or" relationship.

In the communication framework shown in FIG. 1, a packet-based data flow may be transmitted between the terminal device 110 and the network device 120, however, the packet-based data flow is usually bursty.

In other words, the terminal device 110 has data transmission within a period of time, but no data transmission within the next longer period of time. Therefore, if the terminal device 110 performs blind detection on the PDCCH all the time, the power consumption of the terminal device will be too large.

In LTE, the concept of DRX is proposed. Specifically, the main idea of DRX is that: a network may configure predicted DRX ON of the terminal at the network, and the terminal may monitor the downlink control channel. At the same time, the network may also configure predicted DRX OFF of the terminal at the network, that is, the terminal device does not need to monitor the downlink control channel. In this way, if the network device 120 transmits data to the terminal device 110, the network device 120 may schedule the terminal device 110 when the terminal device 110 is within the time of DRX ON, and during the time of DRC OFF, since the radio frequency is turned off, the power consumption of the terminal may be reduced.

Specifically, a Media Access Control (MAC) entity is configured with a DRX function by the RRC to control the terminal to monitor the behavior of the PDCCH.

Figure 2:
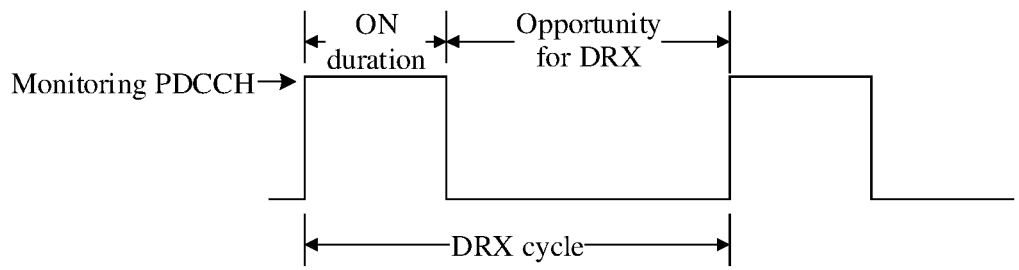
FIG. 2 is a schematic block diagram of DRX according to an embodiment of the present disclosure.

For example, as shown in FIG. 2, the DRX cycle configured by the network device for the terminal device consists of an On Duration and an Opportunity for DRX. In an RRC CONNECTED mode, if the terminal device is configured with the DRX function, the MAC entity may be within the time of On Duration, and the terminal monitors and receives PDCCH. The terminal device does not receive the PDCCH within the time of Opportunity for DRX, so as to reduce power consumption.

It is to be understood that the terminal device in the Opportunity for DRX in the embodiments of the present disclosure does not receive the PDCCH, but may receive data from other physical channels. No specific limits are made to the embodiments of the present disclosure. For example, the terminal device may receive a Physical Downlink Shared Channel (PDSCH), Acknowledgment (ACK)/Non-acknowledgment (NACK), and the like. For another example, in Semi-Persistent Scheduling (SPS), the terminal device may receive periodically configured PDSCH data.

The duration of the On Duration may be controlled by a drx-onDurationTimer and a drx-InactivityTimer. Herein, the drx-onDurationTimer is also referred to as a DRX-activation stage timer. The drx-InactivityTimer is also referred to as an inactivity timer. Specifically, the ON Duration ends when the drx-onDurationTimer expires. The terminal device may extend the duration of the ON Duration by starting the drx-InactivityTimer.

It is to be noted that when DRX is configured, the terminal device monitors the PDCCH within the DRX ON Duration. If data scheduling is received within the ON Duration, the terminal device continues monitoring the PDCCH based on the control of the DRX timer until the data transmission is completed; otherwise, if the terminal device does not receive data scheduling within the DRX ON Duration, the terminal device enters DRX to save energy. It may be seen that DRX is an energy-saving control mechanism with the DRX cycle as the time granularity, so that optimal power consumption control may not be achieved. For example, even if the terminal device has no data scheduling, the terminal device still needs to monitor the PDCCH when the DRX ON Duration timer is periodically started, so that there is still a waste of power.

Figure 3:
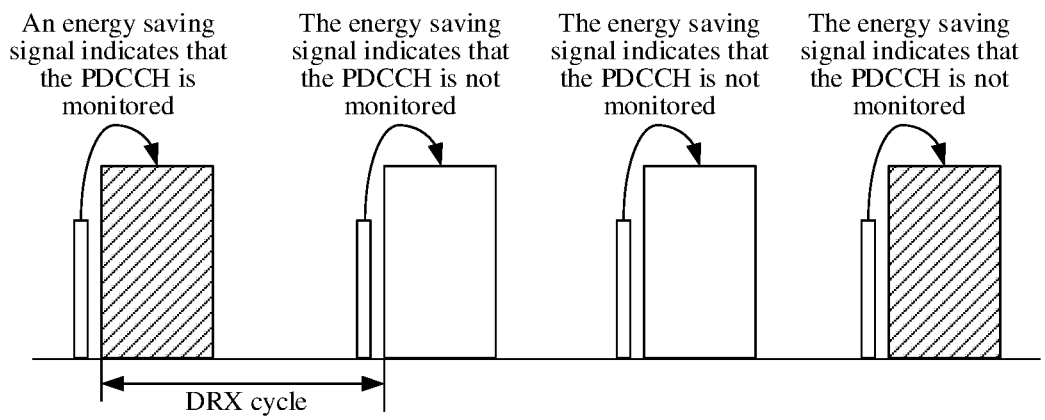
FIG. 3 is a schematic structural diagram of a relationship between an energy saving signal and DRX according to an embodiment of the present disclosure.

FIG. 3 is a schematic structural diagram of a relationship between an energy saving signal and DRX according to an embodiment of the present disclosure.

As shown in FIG. 3, the energy saving signal may also be sent before the DRX cycle, and the energy saving signal is also configured to save energy when the terminal is in the RRC connected state. For example, if the terminal device has no data transmission within the DRX cycle, the energy saving signal may be configured to indicate the terminal device not to monitor the PDCCH within the DRX ON-duration. Therefore, by receiving the energy saving signal, the terminal device may not monitor the PDCCH for a period of time, so as to achieve the purpose of energy saving gain.

In other words, when the terminal has data transmission within the DRX cycle, an energy-saving wake-up signal "wakes up" the terminal to monitor the PDCCH within the DRX ON duration; otherwise, when the terminal has no data transmission within the DRX cycle, the energy-saving wake-up signal does not "wake up" the terminal, and the terminal does not need to monitor the PDCCH within the DRX ON Duration. Compared with the existing DRX mechanism, when the terminal has no data transmission, the terminal may omit PDCCH monitoring within the DRX ON duration, thereby saving energy. The time before the DRX ONduration of the terminal is referred to as the inactive time. The time that the terminal is within the DRX ON Duration is referred to as the activation time.

As can be seen, the power consumption of the terminal device in the RRC connected state may be effectively reduced by combining the energy-saving wake-up signal and the DRX mechanism.

The energy saving signal may be a signal based on a sequence or the PDCCH.

Herein, mapping the energy saving signal to the PDCCH may directly reuse the existing PDCCH design, including aspects such as coding, scrambling, resource mapping, search space, CORESET, and the like, which reduces the workload of standardization. In addition, compatibility and multiplexing characteristics with other signal transmission are good. In addition, since the existing system already supports the PDCCH, the PDCCH has good compatibility and multiplexing characteristics with other channels such as PDSCH.

It is to be understood that the energy saving signal may be applicable to the terminal device in the RRC connected state, and the RRC connected state of the terminal device may include an RRC_INACTIVE state, an RRC_IDLE state and an RRC_CONNECTED state. In the RRC_IDLE state, mobility is UE-based re-selection of cell selection, paging is initiated by a Core Network (CN), and a paging area is configured by the CN. There is no UE Access Stratum (AS) context and no RRC connection on a base station side. In the RRC_CONNECTED state, there is the RRC connection, and there is the UE AS context at the base station and the UE. The network device knows that the position of the UE is a specific cell level. The mobility is controlled by the network device. Unicast data may be transmitted between the UE and the base station. In the RRC_INACTIVE state, the mobility is UE-based re-selection of cell selection, there is a connection between CN and NR, there is the UE AS context on a certain base station, the paging is triggered by an RAN, an RAN-based paging area is managed by the RAN, and the network device knows that the position of the UE is an RAN-based paging area level.

Figure 4:
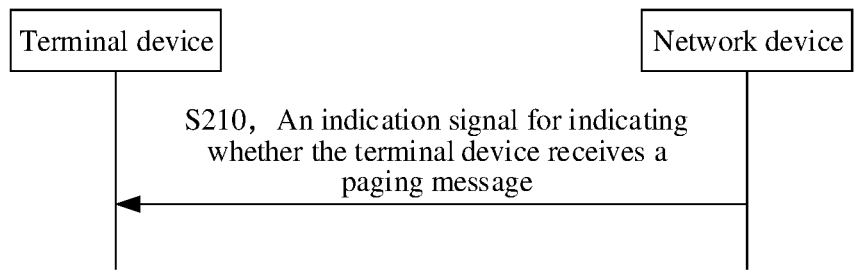
FIG. 4 is a schematic flow interaction diagram of a wireless communication method according to an embodiment of the present disclosure.

FIG. 4 shows a schematic flowchart of a wireless communication method 200 according to an embodiment of the present disclosure. The method 200 may be executed interactively by a terminal device and a network device. The terminal device shown in FIG. 4 may be the terminal device shown in FIG. 1, and the network device shown in FIG. 2 may be the access network device shown in FIG. 1.

As shown in FIG. 4, the method 200 may include some or all of the following contents.

At S210, the terminal device receives an indication signal, the indication signal being configured to indicate whether the terminal device receives a paging message.

In other words, the network device sends the indication information to the terminal device to indicate the terminal device to receive or not to receive the paging message.

Whether the terminal receives the paging message is indicated by the indication information, if there is no paging message, the terminal device may avoid monitoring the paging message to save energy, thereby reducing power consumption of the terminal device.

It is to be understood that the indication signal is configured to indicate whether the terminal device receives the paging message, and it is also to be understood that the indication signal is configured to indicate whether the terminal device monitors the paging message, or the indication signal is configured to indicate the terminal device to receive or not to receive a PDCCH configured to schedule the paging message, or the indication signal is configured to indicate whether the terminal device monitors the PDCCH configured to schedule the paging message, or the indication signal is configured to indicate whether there is a paging message to the terminal device on a PO of the terminal device.

In some embodiments of the present disclosure, the indication signal may be mapped to an idle Resource Element (RE) in an SS/PBCH block. Optionally, the indication signal is mapped to Physical Resource Blocks (PRBs) on both sides of a Primary Synchronization Signal (PSS) in the SS/PBCH block. For example, for the indication signal, resource mapping is performed on the PRBs on both sides of the PSS in the SS/PBCH block in an order from low to high frequency domain; or for the indication signal, resource mapping is performed on the PRBs on both sides of the PSS in the SS/PBCH block in an order from high to low frequency domain. For example, the PRBs on both sides of the PSS respectively include 4 PRBs.

Figure 5:
FIG. 5 is a schematic structural diagram of a position relationship between a Paging Occasion (PO) and a Synchronization Signal (SS)/Physical Broadcast Channel (PBCH) block according to an embodiment of the present disclosure.

FIG. 5 is a schematic structural diagram of a relationship between a PO and an SS/PBCH block according to an embodiment of the present disclosure.

As shown in FIG. 5, the POs are periodically distributed, for example, PO1 to PO5 are periodically distributed on time domain resources. In other words, the network device may periodically send the paging message to the terminal device, and the position where the paging message is monitored is the PO. The PO may also be referred to as a paging moment. The PO of the terminal device is related to an Identifier (ID) of the terminal device, and the POs of different terminal devices may be discretely dispersed within the paging cycle.

When the terminal also needs to perform time-frequency synchronization based on the SS/PBCH block before receiving the paging message, the SS/PBCH block may also be referred to as a Synchronization Signal/PBCH Block (SSB). For example, SSB1 to SSB4 shown in FIG. 5. Before receiving the paging message on the PO, the terminal device generally needs to start a time-frequency synchronization operation several SSB cycles in advance. For example, assuming that the PO corresponding to the paging message of the terminal device is PO5, in order to perform the synchronization operation, the terminal may need to receive SSB1, SSB2 and SSB3 before PO5.

In some embodiments of the present disclosure, if the terminal device does not need to receive the paging message, the network device may send the indication signal several SSB cycles in advance, so that the terminal does not need to perform the synchronization operation. Still taking FIG. 5 as an example, if the indication signal is configured to indicate that the terminal device does not need to receive the paging message, the terminal device may save the reception and processing of SSB1, SSB2, and SSB3 for PO5. Therefore, the energy saving performance of the terminal device may be effectively improved.

It is to be noted that when the terminal is in the RRC idle or RRC inactive state, the energy saving requirements are different from those in the RRC connected state. When the terminal is in the RRC connected state, the energy saving signal is sent before the DRX cycle. If the terminal has no data transmission within the DRX cycle, the energy saving signal may indicate the terminal not to monitor the PDCCH within the DRX ON-duration. Therefore, receiving the energy saving signal potentially replaces not monitoring the PDCCH for a possible period of time, so that the power saving gain is still significant. However, when the terminal is in the RRC idle or RRC inactive state, the terminal only needs to monitor the paging message within the PO, the PO usually corresponds to one time slot or multiple symbols, so that the PO time is relatively short. Therefore, sending the above indication signal directly before the PO is equivalent to replacing the reception of paging in the PO with the energy saving signal, which may not bring about the energy saving gain of the terminal.

In the embodiment of the present disclosure, on the one hand, the indication signal is transmitted on the reserved idle RE resources, which may avoid adding additional resource overhead; on the other hand, SSB transmission supports beam scanning, so that the indication signal on the resources of each SSB block may adopt the same beam as each SSB block for transmission, and the indication signal also supports beam scanning to achieve complete signal coverage of the entire cell; and on another hand, since the time-frequency interval between the indication signal and the corresponding SSB thereof is very small, the indication signal may achieve time-frequency synchronization or channel estimation through the SSB, so as to improve the receiving performance of the indication signal.

It is to be noted that the idle RE may refer to idle resources of the SSB, that is, resources belonging to the SSB and vacant.

In other words, the idle RE may include PRBs on both sides of the PSS in the SS/PBCH block.

Figure 6:
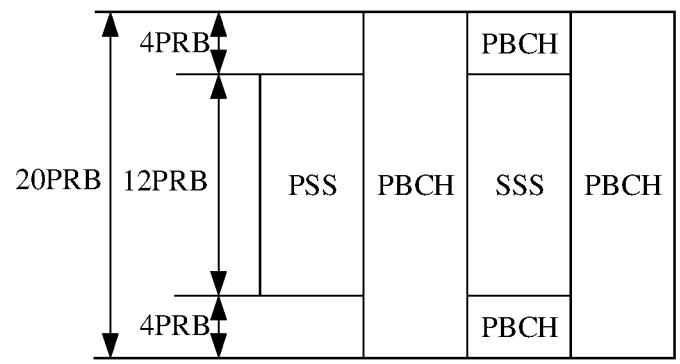
FIG. 6 and FIG. 7 are schematic structural diagrams of an SS/PBCH block according to an embodiment of the present disclosure.
Figure 7:
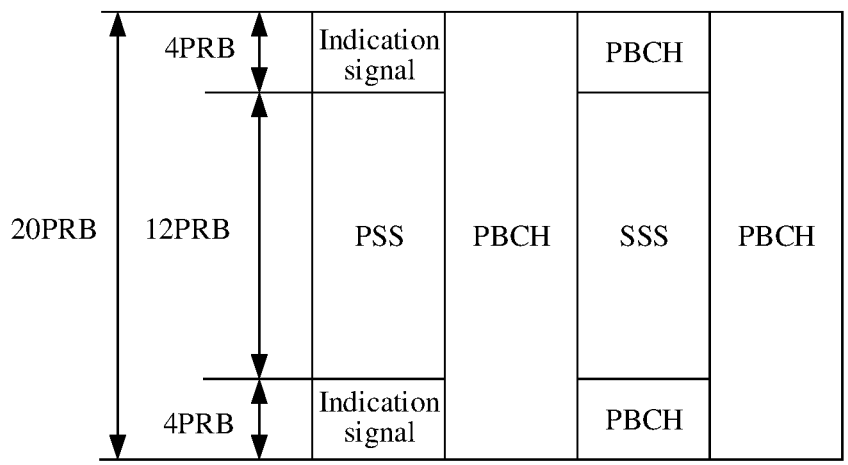

FIG. 6 and FIG. 7 are schematic structural diagrams of an SSB according to an embodiment of the present disclosure.

As shown in FIG. 6, one SSB may include a PSS of one symbol, a Secondary Synchronization Signal (SSS) of one symbol, and four PBCHs. Herein, the time-frequency resources occupied by the PBCH include a Demodulation Reference Signal (DMRS), configured to demodulate the PBCH. One SSB is configured to carry the synchronization signal and the broadcast channel of one beam. In addition, in one SSB, there are 4 PRBs on both sides of the PSS on the PSS symbol, and no signal is transmitted on a total of 8 PRBs. Therefore, the idle resources on both sides of the PSS may be configured to send the indication signal.

As shown in FIG. 7, the PRBs on both sides of the PSS in one SSB may be configured to carry the indication signal.

It is to be noted that FIG. 6 and FIG. 7 are only examples of the present disclosure and should not be construed as limiting the present disclosure.

For example, in FIG. 7, all 8 PRBs in the PRBs on both sides of the PSS may be configured to carry the indication signal, but there are no limits made thereto in the present disclosure. For example, in other alternative embodiments, some PRBs in the 8 PRBs on both sides of the PSS are configured to carry the indication signal. For example, a Subcarrier Spacing (SCS) may be set between the indication signal and the PSS, and the SCS may also be referred to as a guard interval. For example, the SCS may be one or more sub carriers.

In some embodiments of the present disclosure, the SS/PBCH block is located before the PO corresponding to the paging message of the terminal device.

In other words, the terminal device receives the SSB before the PO corresponding to the paging message of the terminal device, and then obtains the indication signal in the SSB, which may not only indicate the terminal device not to receive the paging message, but also may prevent the terminal device from receiving unnecessary SSBs.

In some embodiments of the present disclosure, the indication signal is the PDCCH, or the indication signal is the PBCH. Of course, the indication signal may also be similar to the PDCCH, or the indication signal may also be similar to the PBCH. In other words, the indication signal may use a form similar to the PDCCH or PBCH. For example, the indication signal may be an independent channel similar to the PDCCH or PBCH. Similarity in the present disclosure may refer to design similarity, which may include aspects such as coding, scrambling, resource mapping, search space, CORESET, and the like.

For example, the indication signal using the PDCCH or PBCH or the indication signal similar to the PDCCH or PBCH may occupy the remaining resources on both sides of the PSS, and the maximum amount of available resources is 96 REs. The indication signal using the PDCCH or PBCH or the indication signal similar to the PDCCH or PBCH may carry at least one bit, and in the at least one bit, different bits may correspond to different terminal IDs, or correspond to different terminal group IDs, or correspond to different paging frames, or correspond to different POs or a combination of the above.

Mapping the indication signal to the PDCCH channel may directly reuse the existing PDCCH design, including aspects such as coding, scrambling, resource mapping, search space, CORESET, and the like, which reduces the workload of standardization. In addition, compatibility and multiplexing characteristics with other signal transmission are good. In addition, since the existing system already supports the PDCCH, the PDCCH has good compatibility and multiplexing characteristics with other channels such as PDSCH.

In some embodiments of the present disclosure, the indication signal includes X bits.

In some embodiments of the present disclosure, the method 200 may further include the following operation.

The terminal device obtains a first mapping relationship.

The first mapping relationship includes at least one of:
correspondences between the X bits and the X terminal IDs, the X terminal IDs including the ID of the terminal device;
correspondences between the X bits and the X terminal group IDs, the X terminal group IDs including the group ID of the terminal device;
correspondences between the X bits and the X paging frames, the X paging frames including the paging frame of the terminal device; and
correspondences between the X bits and the X POs, the X POs include the PO corresponding to the paging message of the terminal device.

For example, the indication signal may carry the X bits, and each bit corresponds to one terminal ID or one terminal group ID.

Herein, the terminal ID may be configured to uniquely identify the terminal device, and the terminal group ID may uniquely identify the group of the terminal device. A grouping method of the terminal device is exemplarily described below.

In some embodiments of the present disclosure, the group ID of the terminal device is a numerical value determined based on the ID of the terminal device. For example, the group ID of the terminal device is a numerical value determined by taking the modulo of the ID of the terminal device based on a first threshold, the first threshold is a total number of group IDs. Optionally, the first threshold may be preset, or may be a threshold indicated by the network device. In other embodiments of the present disclosure, the group ID of the terminal device is a numerical value determined based on the AC of the terminal device. For example, the group ID of the terminal device is a numerical value corresponding to the AC of the terminal device. In other words, grouping may be performed by taking the modulo of the ID of the terminal device based on Y, Y being the total number of groups, or grouping may be performed based on the AC of the terminal device, for example, the AC corresponds to the group one-to-one.

In some embodiments of the present disclosure, the method 200 may further include the following operation.

The terminal device determines the value of the bit corresponding to the terminal device in the X bits based on the first mapping relationship and at least one of the following information of the terminal device:
the terminal ID, the terminal group ID, the PO corresponding to the paging message or paging frame.

In some embodiments of the present disclosure, the method 200 may further include the following operation.

The terminal device determines whether to receive the paging message of the terminal device based on the value of the bit corresponding to the terminal device.

In short, the terminal device may determine the value of the bit based on the first mapping relationship and at least one of the terminal ID, the terminal group ID, the PO corresponding to the paging message or paging frame of the terminal device, and then determines to receive or not to receive the paging message based on the value of the bit. For example, if the value is 0, it indicates that the paging message is received, and if the value is 1, it indicates that the paging message is not received.

In other words, the network device may also obtain the first mapping relationship, the first mapping relationship being configured to determine the indication signal. The network device may determine the value of the bit corresponding to the terminal device in the X bits based on the first mapping relationship and at least one of the following information of the terminal device: the terminal ID, the terminal group ID, the PO corresponding to the paging message or paging frame. The value of the bit corresponding to the terminal device is configured to indicate whether the terminal device receives the paging message.

In other words, the network device may obtain the indication signal based on the first mapping relationship.

In some embodiments of the present disclosure, the first mapping relationship is preset, and/or the first mapping relationship is notified by signaling received by the terminal device. In other words, the first mapping relationship is preset, and/or the first mapping relationship is signaling or information sent by the network device. For example, the first mapping relationship is carried in the signaling sent by the network device to the terminal device. In other words, the network device may also send the first mapping relationship to the terminal device. Optionally, the signaling is RRC-specific signaling or broadcast signaling.

In some embodiments of the present disclosure, the indication signal includes N*M bits.

In some embodiments of the present disclosure, the method 200 may further include the following operation.

The terminal device obtains a second mapping relationship and a third mapping relationship.

The second mapping relationship includes at least one of:
correspondences between M bit groups and at least one paging frame, the at least one paging frame including a paging frame corresponding to the paging message of the terminal device; and
correspondences between the M bit groups and at least one PO, the at least one PO including a PO corresponding to the paging message of the terminal device.

Each of the M bit groups includes consecutive N bits.

The third mapping relationship includes at least one of:
correspondences between the N bits and the N terminal IDs, the N terminal IDs including the ID of the terminal device;
correspondences between the N bits and the N terminal group IDs, the N terminal group IDs including the group ID of the terminal device; and
correspondences between the N bits and the N POs, the N POs including the PO corresponding to the paging message of the terminal device.

In other words, each of the N bits corresponds to the terminal ID or the terminal group ID. The M N bits correspond to M POs or paging frames respectively.

In some embodiments of the present disclosure, the method 200 may further include the following operations.

The terminal device determines a bit group corresponding to the terminal device from the M bit groups based on the second mapping relationship and at least one of the following information of the terminal device:
the PO corresponding to the paging message or paging frame.

The terminal device determines the value of the bit corresponding to the terminal device from the bit group corresponding to the terminal device based on the third mapping relationship and at least one of the following information of the terminal device:
the terminal ID or terminal group ID.

In some embodiments of the present disclosure, the method 200 may further include the following operation.

The terminal device determines whether to receive the paging message of the terminal device based on the value of the bit corresponding to the terminal device.

In short, the terminal device may determine the value of the bit based on the second mapping relationship and the third mapping relationship, and then determine whether to receive or not to receive the paging message based on the value of the bit. For example, if the value is 0, it indicates that the paging message is received, and if the value is 1, it indicates that the paging message is not received.

In other words, the network device may also obtain second mapping relationship and the third mapping relationship, and the second mapping relationship and the third mapping relationship may be configured to determine the indication signal. The network device determines a bit group corresponding to the terminal device from the M bit groups based on the second mapping relationship and at least one of the following information of the terminal device: the paging frame or the paging message corresponding to the PO. The network device determines the value of the bit corresponding to the terminal device from the bit group corresponding to the terminal device based on the third mapping relationship and at least one of the following information of the terminal device: the terminal ID or the terminal group ID. The value of the bit corresponding to the terminal device is configured to indicate whether the terminal device receives the paging message.

In other words, the network device may obtain the indication signal based on the second mapping relationship and the third mapping relationship.

In some embodiments of the present disclosure, the second mapping relationship or the third mapping relationship is preset, and/or the second mapping relationship or the third mapping relationship is notified by the signaling received by the terminal device. In other words, the third mapping relationship may be preset, and/or the second mapping relationship or the third mapping relationship is signaling or information sent by the network device. For example, the second mapping relationship or the third mapping relationship may be carried in the signaling sent by the network device to the terminal device. In other words, the network device may also send the second mapping relationship or the third mapping relationship to the terminal device. Optionally, the signaling is RRC-specific signaling or broadcast signaling.

Figure 8:
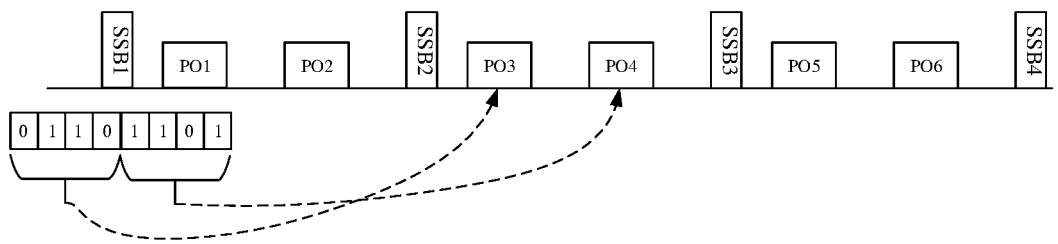
FIG. 8 is a schematic structural diagram of an indication signal according to an embodiment of the present disclosure.

FIG. 8 is a schematic block diagram of an indication signal according to an embodiment of the present disclosure.

As shown in FIG. 8, the indication signal (taking the indication signal on both sides of the PSS of SSB1 as an example, the indication signal is not drawn in the figure; since the indication signal is located on both sides of the PSS in the SSB block, the position of the indication signal may refer to the position of the SSB) PDCCH DCI carries a total of 8 bits, of which the first 4 bits of the 8 bits correspond to PO3, and the last 4 bits correspond to PO4. Each of the first and last 4 bits corresponds to four terminal group IDs on the corresponding PO, for example, terminal group IDs 1, 2, 3, and 4. For example, the value of the bit being 0 indicates that the terminal in the corresponding terminal group has the paging message, and the value of the bit being 1 indicates that the terminal in the corresponding terminal group has no paging message. In other words, if the value of the bit corresponding to the terminal device is 1, the terminal device does not need to receive the paging message. If the value of the bit corresponding to the terminal device is 0, the terminal device needs to receive the paging message. Of course, in other alternative embodiments, the value of the bit may also indicate that the terminal in the corresponding terminal group has no paging message, and the value of the bit being 1 may also indicate that the terminal in the corresponding terminal group has the paging message.

As an example, assuming that the indication signal received by the terminal device is 01101101 as shown in FIG. 8, if the PO of the terminal device is PO3 and the group ID of the terminal device is 1, then the corresponding value of the bit of the terminal device is 0. If 0 indicates that the terminal in the corresponding terminal group has no paging message, the terminal device does not receive the paging message.

In some embodiments of the present disclosure, a number of bits of the indication signal is preset; and/or the number of bits of the indication signal is notified by the signaling received by the terminal device. For example, the number of bits of the indication signal in FIG. 8 is 8 bits.

When the number of bits of the indication signal is limited, the number of all possible combinations of bits will also be relatively small. The present disclosure further detects the indication signal based on a method of correlation detection by generating all the bit combinations to reconstruct the indication signal, which may reduce the complexity of detection and improve the detection performance.

In some embodiments of the present disclosure, the method 200 may further include the following operation.

The terminal device receives the indication signal based on a first timing relationship. The first timing relationship includes a timing relationship between a first time position and at least one PO, the first time position is a time position at which the terminal device receives the indication signal, and the at least one PO is the PO corresponding to the paging message of the terminal device. For example, the terminal device obtains the first timing relationship, and receives the indication signal based on the first timing relationship.

In other words, the network device sends the indication signal based on the first timing relationship. For example, the network device obtains the first timing relationship, and sends the indication signal based on the first timing relationship. In short, the first timing relationship may be configured to determine the indication signal.

In some embodiments of the present disclosure, the first timing relationship includes:

a first time interval or a range of the first time interval, the first time interval being a time interval between the first time position and the at least one PO; and/or a number of the at least one PO.

Figure 9:
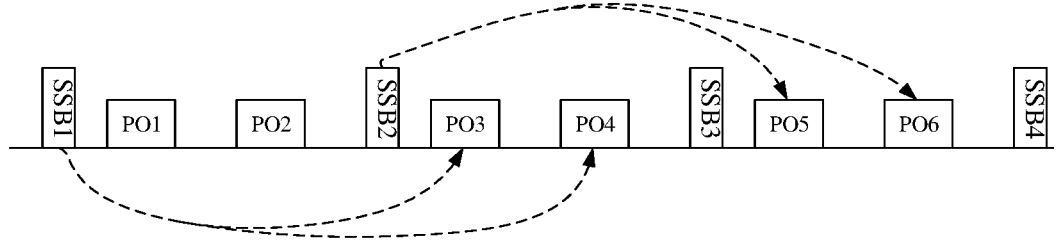
FIG. 9 is a schematic structural diagram of a first timing relationship according to an embodiment of the present disclosure.

FIG. 9 is an example of a first timing relationship according to an embodiment of the present disclosure.

As shown in FIG. 9, the indication signal in SSB1 indicates PO3 and PO4 after SSB2, and the indication signal in SSB2 indicates PO5 and PO6 after SSB3.

In some embodiments of the present disclosure, the first time interval is a time interval between the first time position and the first PO of the at least one PO. For example, after the terminal device determines the time interval between the SSB and the first PO corresponding thereto, other corresponding POs may be determined according to the number of POs corresponding to the SSB. For example, as shown in FIG. 9, the indication signals on both sides of the PSS in SSB1 are separated from the first PO indicated by the indication signal one SSB cycle. If the number of corresponding POs is 2, it indicates PO3 and PO4 after one SSB cycle.

In other embodiments of the present disclosure, the first time interval is at least one SS/PBCH block cycle. For example, as shown in FIG. 9, the indication signals on both sides of the PSS in SSB1 indicate PO3 and PO4 after one SSB cycle.

In some embodiments of the present disclosure, the first timing relationship is preset, and/or the first timing relationship is notified by the signaling received by the terminal device. In other words, the first timing relationship is preset, and/or the first timing relationship is signaling sent by the network device. For example, the first timing relationship is carried in the signaling sent by the network device. In other words, the network device may also send the first timing relationship to the terminal device. Optionally, the signaling is RRC-specific signaling or broadcast signaling.

Of course, FIG. 8 and FIG. 9 are only examples of the present disclosure, and should not be construed as limiting the present disclosure.

For example, in other alternative embodiments, a number of the at least one PO in the first timing relationship may also be other numerical values other than 2.

In some embodiments of the present disclosure, the indication signal may be in the form of a sequence. For example, the indication signal may be a ZC sequence or m sequence.

For example, the indication signal indicates different terminal IDs, different terminal group IDs, different paging frames or different POs through different sequences or different sequence offsets of the same sequence. For example, the indication signal is mapped to the PRBs on both sides of the PSS in the SS/PBCH block, and the PRBs on both sides of the PSS are configured to transmit the same sequence, or the PRBs on both sides of the PSS are configured to transmit different sequences. For example, the indication signal is mapped to the PRBs on both sides of the PSS in the SS/PBCH block, and the PRBs on both sides of the PSS are configured to transmit different sequences, and the sequences at different positions correspond to different terminal IDs, different terminal group IDs, different paging frames or different POs.

Figure 10:
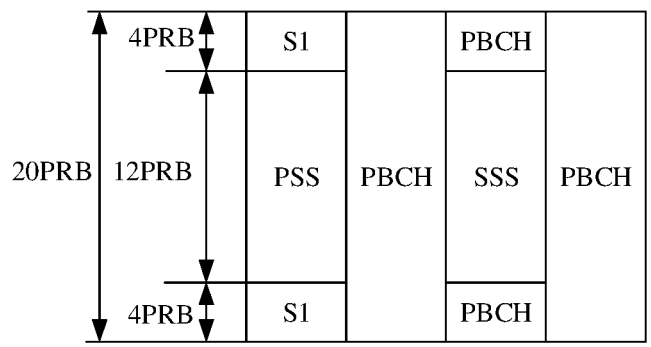
FIG. 10 and FIG. 11 are other schematic structural diagrams of an SS/PBCH block according to an embodiment of the present disclosure.
Figure 11:
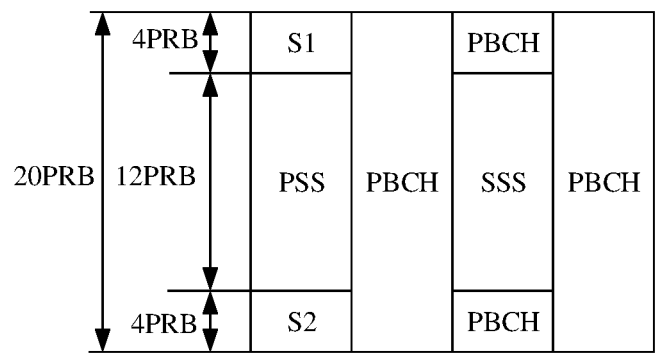

FIG. 10 and FIG. 11 are other schematic structural diagrams of an SSB according to an embodiment of the present disclosure.

As shown in FIG. 10, the resources on both sides of the PSS may be configured to transmit the same long sequence, that is, the resources on both sides of the PSS transmit two parts of the sequence S1 respectively. As shown in FIG. 11, the resources on both sides of the PSS may transmit the short sequence respectively, that is, the resources on both sides of the PSS transmit the sequences S1 and S2 respectively.

In some embodiments of the present disclosure, an antenna port used by the indication signal and an antenna port used by the DMRS of the indication signal are respectively the same as an antenna port used by at least one of the following signals:

the PSS, the SSS, and the PBCH DMRS.

The method 200 may further include the following operation.

The terminal device obtains a fourth mapping relationship, the fourth mapping relationship including a power relationship among the indication signal, the DMRS of the indication signal, and at least one of the following signals:

the PSS, the SSS, and the PBCH DMRS.

In some embodiments of the present disclosure, the fourth mapping relationship is preset, and/or the fourth mapping relationship is notified by the signaling received by the terminal device. In other words, the fourth mapping relationship is preset, and/or the fourth mapping relationship is signaling sent by the network device. For example, the fourth mapping relationship is carried in the signaling sent by the network device. In other words, the network device may also send the fourth mapping relationship to the terminal device. Optionally, the signaling is RRC-specific signaling or broadcast signaling.

In other words, if the indication signal is constructed as the PDCCH or PBCH, or the indication signal is constructed in a form similar to the PDCCH or PBCH, in the resources occupied by the indication signal, in addition to the payload, the DMRS may also need to be transmitted to demodulate the indication signal. The PSS or SSS or PBCH DMRS in the SSB block may be configured to demodulate the indication signal to improve the detection performance of the indication signal. For example, the indication signal and the DMRS thereof use the same antenna port as the PSS or SSS or PBCH DMRS, and the terminal needs to know the power relationship among the indication signal and the DMRS thereof and the PSS or SSS or PBCH DMRS (for example, it may be preset or notified by the network to the terminal). In other words, the indication signal only uses the PSS, SSS or PBCH DMRS for demodulation, and does not need its own specific DMRS, which is beneficial to use all limited resources to transmit load information and improve data transmission performance.

In some embodiments of the present disclosure, the RRC connection of the terminal device is in an idle state or an inactive state.

The preferred implementation modes of the present disclosure are described in detail above in combination with the drawings. However, the present disclosure is not limited to the specific details of the above implementation modes. Various simple modifications may be made to the technical solutions of the present disclosure within the scope of the technical conception of the present disclosure. These simple modifications all belong to the scope of protection of the present disclosure. For example, the various specific technical features described in the above specific implementation modes may be combined in any suitable way without conflicts. In order to avoid unnecessary repetitions, no more descriptions will be made to the various possible combinations in the present disclosure. For another example, the various implementation modes of the present disclosure may also be combined arbitrarily, and should also be regarded as the content disclosed in the present disclosure without departing from the conception of the present disclosure.

It is to be understood that, in various method embodiments of the present disclosure, a magnitude of a sequence number of each above process does not mean an execution sequence and the execution sequence of each process should be determined by its function and an internal logic and should not form any limit to an implementation process of the embodiments of the present disclosure. In addition, in the embodiments of the present disclosure, the terms "downlink" and "uplink" are configured to indicate the transmission direction of a signal or data. Herein, "downlink" is configured to indicate that the transmission direction of the signal or data is a first direction sent from a site to the UE of a cell, and "uplink" is configured to indicate that the transmission direction of the signals or data is a second direction sent from the UE of the cell to the site. For example, "downlink signal" indicates that the transmission direction of the signal is the first direction. In addition, the term "and/or" in the embodiments of the present disclosure is only an association relationship describing associated objects and represents that three relationships may exist. Specifically, A and/or B may represent three conditions: i.e., independent existence of A, existence of both A and B and independent existence of B. In addition, the character "/" in the present disclosure usually represents that previous and next associated objects form an "or" relationship.

The method embodiments of the present disclosure are described in detail above with reference to FIGS. 1 to 11, and the apparatus embodiments of the present disclosure are described in detail below with reference to FIGS. 12 to 15.

Figure 12:
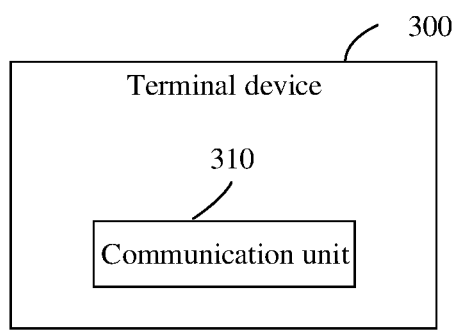
FIG. 12 is a schematic block diagram of a terminal device according to an embodiment of the present disclosure.

FIG. 12 is a schematic block diagram of a terminal device 300 according to an embodiment of the present disclosure.

As shown in FIG. 12, the terminal device 300 may include: a communication unit 310.

The communication unit 310 is configured to receive an indication signal, the indication signal being configured to indicate whether the terminal device receives a paging message.

In some embodiments of the present disclosure, the indication signal is mapped to an idle RE in an SS/PBCH block.

In some embodiments of the present disclosure, the indication signal is mapped to PRBs on both sides of a PSS in the SS/PBCH block.

In some embodiments of the present disclosure, for the indication signal, resource mapping is performed on the PRBs on both sides of the PSS in the SS/PBCH block in an order from low to high frequency domain; or for the indication signal, resource mapping is performed on the PRBs on both sides of the PSS in the SS/PBCH block in an order from high to low frequency domain.

In some embodiments of the present disclosure, the PRBs on both sides of the PSS respectively include 4 PRBs.

In some embodiments of the present disclosure, the SS/PBCH block is located before a PO corresponding to the paging message of the terminal device.

In some embodiments of the present disclosure, the indication signal is a PDCCH, or the indication signal is a PBCH.

In some embodiments of the present disclosure, the indication signal includes X bits.

In some embodiments of the present disclosure, the communication unit 310 is further configured to:

obtain a first mapping relationship.

The first mapping relationship includes at least one of:

correspondences between the X bits and X terminal IDs, the X terminal IDs including an ID of the terminal device;

correspondences between the X bits and X terminal group IDs, the X terminal group IDs including a group ID of the terminal device;

correspondences between the X bits and X paging frames, the X paging frames including a paging frame of the terminal device; and correspondences between the X bits and the X POs, the X POs include the PO corresponding to the paging message of the terminal device.

In some embodiments of the present disclosure, the communication unit 310 is further configured to:

determine a value of a bit corresponding to the terminal device from the X bits based on the first mapping relationship and at least one of the following information of the terminal device:

the terminal ID, the terminal group ID, the PO corresponding to the paging message or paging frame.

In some embodiments of the present disclosure, the communication unit 310 is further configured to:

determine whether to receive the paging message of the terminal device based on the value of the bit corresponding to the terminal device.

In some embodiments of the present disclosure, the first mapping relationship is preset, and/or the first mapping relationship is notified by signaling received by the terminal device.

In some embodiments of the present disclosure, the indication signal includes N*M bits.

In some embodiments of the present disclosure, the communication unit 310 is further configured to:

obtain a second mapping relationship and a third mapping relationship.

The second mapping relationship includes at least one of:

correspondences between M bit groups and at least one paging frame, the at least one paging frame including a paging frame corresponding to the paging message of the terminal device; and correspondences between the M bit groups and at least one PO, the at least one PO including a PO corresponding to the paging message of the terminal device.

Each of the M bit groups includes consecutive N bits.

The third mapping relationship includes at least one of:

correspondences between the N bits and the N terminal IDs, the N terminal IDs including the ID of the terminal device;

correspondences between the N bits and the N terminal group IDs, the N terminal group IDs including the group ID of the terminal device; and correspondences between the N bits and the N POs, the N POs including the PO corresponding to the paging message of the terminal device.

In some embodiments of the present disclosure, the communication unit 310 is further configured to:

determine a bit group corresponding to the terminal device from the M bit groups based on the second mapping relationship and at least one of the following information of the terminal device:

the PO corresponding to the paging message or paging frame; and determine the value of the bit corresponding to the terminal device from the bit group corresponding to the terminal device based on the third mapping relationship and at least one of the following information of the terminal device:

the terminal ID or terminal group ID.

In some embodiments of the present disclosure, the communication unit 310 is further configured to:

determine whether to receive the paging message of the terminal device based on the value of the bit corresponding to the terminal device.

In some embodiments of the present disclosure, the second mapping relationship or the third mapping relationship is preset, and/or the second mapping relationship or the third mapping relationship is notified by the signaling received by the terminal device.

In some embodiments of the present disclosure, a number of bits of the indication signal is preset; and/or the number of bits of the indication signal is notified by the signaling received by the terminal device.

In some embodiments of the present disclosure, the group ID of the terminal device is a numerical value determined based on the ID of the terminal device.

In some embodiments of the present disclosure, the group ID of the terminal device is a numerical value determined by taking the modulo of the ID of the terminal device based on a first threshold, the first threshold is a total number of group IDs.

In some embodiments of the present disclosure, the group ID of the terminal device is a numerical value determined based on the AC of the terminal device.

In some embodiments of the present disclosure, the group ID of the terminal device is a numerical value corresponding to the AC of the terminal device.

In some embodiments of the present disclosure, the indication signal is a ZC sequence or m sequence.

In some embodiments of the present disclosure, the indication signal indicates different terminal IDs, different terminal group IDs, different paging frames or different POs through different sequences or different sequence offsets of the same sequence.

In some embodiments of the present disclosure, the indication signal is mapped to PRBs on both sides of a PSS in the SS/PBCH block, and the PRBs on both sides of the PSS are configured to transmit the same sequence, or the PRBs on both sides of the PSS are configured to transmit different sequences.

In some embodiments of the present disclosure, the indication signal is mapped to the PRBs on both sides of the PSS in the SS/PBCH block, and the PRBs on both sides of the PSS are configured to transmit different sequences, and the sequences at different positions correspond to different terminal IDs, different terminal group IDs, different paging frames or different POs.

In some embodiments of the present disclosure, the communication unit 310 is specifically configured to:

receive the indication signal based on a first timing relationship, the first timing relationship including a timing relationship between a first time position and at least one PO, the first time position being a time position at which the terminal device receives the indication signal, and the at least one PO being the PO corresponding to the paging message of the terminal device.

In some embodiments of the present disclosure, the communication unit 310 is further configured to:

obtain the first timing relationship.

In some embodiments of the present disclosure, the first timing relationship includes:

a first time interval or a range of the first time interval, the first time interval being a time interval between the first time position and the at least one PO; and/or a number of the at least one PO.

In some embodiments of the present disclosure, the first time interval is a time interval between the first time position and the first PO of the at least one PO.

In some embodiments of the present disclosure, the first time interval is at least one SS/PBCH block cycle.

In some embodiments of the present disclosure, the first timing relationship is preset, and/or the first timing relationship is notified by signaling received by the terminal device.

In some embodiments of the present disclosure, an antenna port used by the indication signal and an antenna port used by the DMRS of the indication signal are respectively the same as an antenna port used by at least one of the following signals:

the PSS, the SSS, and the PBCH DMRS.

In some embodiments of the present disclosure, the terminal device further includes the following operation.

The terminal device obtains a fourth mapping relationship, the fourth mapping relationship including a power relationship among the indication signal, the DMRS of the indication signal, and at least one of the following signals: the PSS, the SSS, and the PBCH DMRS.

In some embodiments of the present disclosure, the fourth mapping relationship is preset, and/or the fourth mapping relationship is notified by the signaling received by the terminal device.

In some embodiments of the present disclosure, the RRC connection of the terminal device is in an idle state or an inactive state.

It is to be understood that the apparatus embodiments and the method embodiments may correspond to each other, and similar descriptions may refer to the method embodiments. Specifically, the terminal device 300 shown in FIG. 12 may correspond to the corresponding main body in executing the method 200 of the embodiments of the present disclosure, and the aforementioned and other operations and/or functions of the various units in the terminal device 300 are respectively for the purpose of realizing the method shown in FIG. 4. For the sake of brevity, the corresponding processes in each of the methods are not repeated here.

Figure 13:
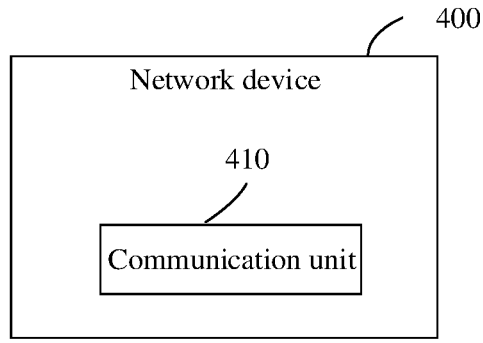
FIG. 13 is a schematic block diagram of a network device according to an embodiment of the present disclosure.

FIG. 13 is a schematic block diagram of a network device 400 according to an embodiment of the present disclosure.

As shown in FIG. 13, the network device 400 may include: a communication unit 410.

The communication unit 410 is configured to send an indication signal, the indication signal being configured to indicate whether the terminal device receives a paging message.

In some embodiments of the present disclosure, the indication signal is mapped to an idle RE in an SS/PBCH block.

In some embodiments of the present disclosure, the indication signal is mapped to PRBs on both sides of a PSS in the SS/PBCH block.

In some embodiments of the present disclosure, for the indication signal, resource mapping is performed on the PRBs on both sides of the PSS in the SS/PBCH block in an order from low to high frequency domain; or for the indication signal, resource mapping is performed on the PRBs on both sides of the PSS in the SS/PBCH block in an order from high to low frequency domain.

In some embodiments of the present disclosure, the PRBs on both sides of the PSS respectively include 4 PRBs.

In some embodiments of the present disclosure, the SS/PBCH block is located before a PO corresponding to the paging message of the terminal device.

In some embodiments of the present disclosure, the indication signal is a PDCCH, or the indication signal is a PBCH.

In some embodiments of the present disclosure, the indication signal includes X bits.

In some embodiments of the present disclosure, the communication unit 410 is further configured to:

obtain a first mapping relationship.

The first mapping relationship includes at least one of:

correspondences between the X bits and X terminal IDs, the X terminal IDs including an ID of the terminal device;

correspondences between the X bits and X terminal group IDs, the X terminal group IDs including a group ID of the terminal device;

correspondences between the X bits and X paging frames, the X paging frames including a paging frame of the terminal device; and correspondences between the X bits and the X POs, the X POs include the PO corresponding to the paging message of the terminal device.

In some embodiments of the present disclosure, the communication unit 410 is further configured to:

determine a value of a bit corresponding to the terminal device from the X bits based on the first mapping relationship and at least one of the following information of the terminal device:

the terminal ID, the terminal group ID, the PO corresponding to the paging message or paging frame.

In some embodiments of the present disclosure, the value of the bit corresponding to the terminal device is configured to indicate whether the terminal device receives the paging message.

In some embodiments of the present disclosure, the first mapping relationship is preset, and/or the first mapping relationship is signaling or information sent by the network device.

In some embodiments of the present disclosure, the indication signal includes N*M bits.

In some embodiments of the present disclosure, the communication unit 410 is further configured to:

obtain a second mapping relationship and a third mapping relationship.

The second mapping relationship includes at least one of:

correspondences between M bit groups and at least one paging frame, the at least one paging frame including a paging frame corresponding to the paging message of the terminal device; and correspondences between the M bit groups and at least one PO, the at least one PO including a PO corresponding to the paging message of the terminal device.

Each of the M bit groups includes consecutive N bits.

The third mapping relationship includes at least one of:

correspondences between the N bits and the N terminal IDs, the N terminal IDs including the ID of the terminal device;

correspondences between the N bits and the N terminal group IDs, the N terminal group IDs including the group ID of the terminal device; and correspondences between the N bits and the N POs, the N POs including the PO corresponding to the paging message of the terminal device.

In some embodiments of the present disclosure, the communication unit 410 is further configured to:

determine a bit group corresponding to the terminal device from the M bit groups based on the second mapping relationship and at least one of the following information of the terminal device:

the PO corresponding to the paging message or paging frame; and determine the value of the bit corresponding to the terminal device from the bit group corresponding to the terminal device based on the third mapping relationship and at least one of the following information of the terminal device:

the terminal ID or terminal group ID.

In some embodiments of the present disclosure, the value of the bit corresponding to the terminal device is configured to indicate whether the terminal device receives the paging message.

In some embodiments of the present disclosure, the second mapping relationship or the third mapping relationship is preset, and/or the second mapping relationship or the third mapping relationship is signaling sent by the network device.

In some embodiments of the present disclosure, a number of bits of the indication signal is preset; and/or the number of bits of the indication signal is notified by the signaling received by the terminal device.

In some embodiments of the present disclosure, the group ID of the terminal device is a numerical value determined based on the ID of the terminal device.

In some embodiments of the present disclosure, the group ID of the terminal device is a numerical value determined by taking the modulo of the ID of the terminal device based on a first threshold, the first threshold is a total number of group IDs.

In some embodiments of the present disclosure, the group ID of the terminal device is a numerical value determined based on the AC of the terminal device.

In some embodiments of the present disclosure, the group ID of the terminal device is a numerical value corresponding to the AC of the terminal device.

In some embodiments of the present disclosure, the indication signal is a ZC sequence or m sequence.

In some embodiments of the present disclosure, the indication signal indicates different terminal IDs, different terminal group IDs, different paging frames or different POs through different sequences or different sequence offsets of the same sequence.

In some embodiments of the present disclosure, the indication signal is mapped to PRBs on both sides of a PSS in the SS/PBCH block, and the PRBs on both sides of the PSS are configured to transmit the same sequence, or the PRBs on both sides of the PSS are configured to transmit different sequences.

In some embodiments of the present disclosure, the indication signal is mapped to the PRBs on both sides of the PSS in the SS/PBCH block, and the PRBs on both sides of the PSS are configured to transmit different sequences, and the sequences at different positions correspond to different terminal IDs, different terminal group IDs, different paging frames or different POs.

In some embodiments of the present disclosure, the communication unit 410 is specifically configured to:

send the indication signal based on a first timing relationship, the first timing relationship including a timing relationship between a first time position and at least one PO, the first time position being a time position at which the terminal device receives the indication signal, and the at least one PO being the PO corresponding to the paging message of the terminal device.

In some embodiments of the present disclosure, the communication unit 410 is further configured to:

obtain the first timing relationship.

In some embodiments of the present disclosure, the first timing relationship includes:

a first time interval or a range of the first time interval, the first time interval being a time interval between the first time position and the at least one PO; and/or a number of the at least one PO.

In some embodiments of the present disclosure, the first time interval is a time interval between the first time position and the first PO of the at least one PO.

In some embodiments of the present disclosure, the first time interval is at least one SS/PBCH block cycle.

In some embodiments of the present disclosure, the first timing relationship is preset, and/or the first timing relationship is signaling or information sent by the network device.

In some embodiments of the present disclosure, an antenna port used by the indication signal and an antenna port used by the DMRS of the indication signal are respectively the same as an antenna port used by at least one of the following signals:

the PSS, the SSS, and the PBCH DMRS.

In some embodiments of the present disclosure, the network device further includes the following operation.

The network device obtains a fourth mapping relationship, the fourth mapping relationship including a power relationship among the indication signal, the DMRS of the indication signal, and at least one of the following signals:

the PSS, the SSS, and the PBCH DMRS.

In some embodiments of the present disclosure, the fourth mapping relationship is preset, and/or the fourth mapping relationship is signaling or information sent by the network device.

In some embodiments of the present disclosure, the RRC connection of the terminal device is in an idle state or an inactive state.

It is to be understood that the apparatus embodiments and the method embodiments may correspond to each other, and similar descriptions may refer to the method embodiments. Specifically, the network device 400 shown in FIG. 13 may correspond to the corresponding main body in executing the method 200 of the embodiments of the present disclosure, and the aforementioned and other operations and/or functions of the various units in the network device 400 are respectively for the purpose of realizing the method shown in FIG. 4. For the sake of brevity, the corresponding processes in each of the methods are not repeated here.

The communication device of the embodiments of the present disclosure is described above from the perspective of functional modules in combination with the drawings. It is to be understood that the functional module may be implemented in a hardware form, may also be implemented by an instruction in a software form, and may also be implemented by a combination of hardware and software modules.

Specifically, each step of the method embodiments in the embodiments of the present disclosure may be completed through an integrated logical circuit of hardware in a processor and/or an instruction in a software form. The steps of the method disclosed in combination with the embodiments of the present disclosure may directly be embodied to be executed and completed by a hardware decoding processor or executed and completed by a combination of hardware and software modules in the decoding processor.

Optionally, the software module may be located in a mature storage medium in this field such as a Random Access Memory (RAM), a flash memory, a Read-Only Memory (ROM), a Programmable ROM (PROM) or an Electrically Erasable PROM (EEPROM) and a register. The storage medium is located in the memory, and the processor reads the information in the memory to complete the steps of the above method embodiments in combination with hardware.

For example, the communication unit referred to above may be implemented by a transceiver.

Figure 14:
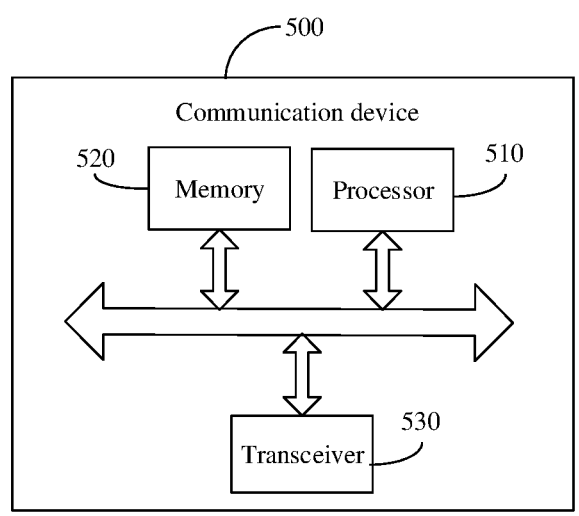
FIG. 14 is a schematic block diagram of a communication device according to an embodiment of the present disclosure.

FIG. 14 is a schematic structural diagram of a communication device 500 according to an embodiment of the present disclosure.

As shown in FIG. 14, the communication device 500 may include a processor 510.

Herein, the processor 510 may call and run a computer program in the memory to implement the method in the embodiments of the present disclosure.

Referring to FIG. 14, the communication device 500 may further include a memory 520.

Herein, the memory 520 may be configured to store indication information, and may also be configured to store codes, instructions, etc. executed by the processor 510. The processor 510 may call and run a computer program in the memory 520 to implement the method in the embodiments of the present disclosure. The memory 520 may be a separate device independent of the processor 510, or may be integrated in the processor 510.

Referring to FIG. 14, the communication device 500 may further include a transceiver 530.

Herein, the processor 510 may control the transceiver 530 to communicate with other devices, specifically, may send information or data to other devices, or receive information or data sent by other devices. The transceiver 530 may include a transmitter and a receiver. The transceiver 530 may further include an antenna. The number of the antennas may be one or more.

It is to be understood that various components in the communication device 500 are connected through a bus system. Herein, in addition to a data bus, the bus system further includes a power bus, a control bus, and a status signal bus.

It is also to be understood that the communication device 500 may be the terminal device of the embodiments of the present disclosure. The communication device 500 may implement the corresponding flows implemented by the terminal device in each method of the embodiments of the present disclosure, that is, the communication device 500 of the embodiments of the present disclosure may correspond to the terminal device 300 in the embodiments of the present disclosure, and may correspond to the corresponding main body in executing the method 200 of the embodiments of the present disclosure. For simplicity, no more elaborations will be made herein. Similarly, the communication device 500 may be the network device of the embodiments of the present disclosure, and the communication device 500 may implement the corresponding flows implemented by the network device in each method of the embodiments of the present disclosure. That is, the communication device 500 of the embodiments of the present disclosure may correspond to the network device 400 in the embodiments of the present disclosure, and may also correspond to the main body in executing the method 200 of the embodiments of the present disclosure. For the sake of brevity, the corresponding processes in each of the methods are not repeated here.

In addition, the embodiments of the present disclosure also provide a chip.

For example, the chip may be an integrated circuit chip with signal processing capability for implementing or executing each method, step, and logic block diagram disclosed in the embodiments of the present disclosure. The chip may also be referred to as a system-on-chip, a system chip, a chip system, or a system-on-chip, or the like. Optionally, the chip may be applied to various communication devices, so that the communication device installed with the chip may execute each method, step and logic block diagram disclosed in the embodiments of the present disclosure.

Figure 15:
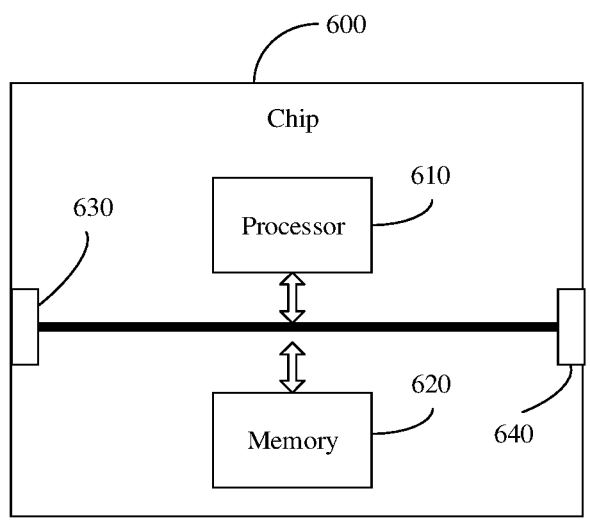
FIG. 15 is a schematic block diagram of a chip according to an embodiment of the present disclosure.

FIG. 15 is a schematic structural diagram of a chip 600 according to an embodiment of the present disclosure.

Referring to FIG. 15, the chip 600 includes a processor 610.

Herein, the processor 610 may call and run a computer program in the memory to implement the method in the embodiments of the present disclosure.

Referring to FIG. 15, the chip 600 may further include a memory 620.

The processor 610 may call and run a computer program in the memory 620 to implement the method in the embodiments of the present disclosure. The memory 620 may be configured to store indication information, and may also be configured to store codes, instructions, etc. executed by the processor 610. The memory 620 may be a separate device independent of the processor 610, or may be integrated in the processor 610.

Referring to FIG. 15, the chip 600 may further include an input interface 630.

Herein, the processor 610 may control the input interface 630 to communicate with another device or chip, specifically acquiring information or data sent by other devices or chips.

Referring to FIG. 15, the chip 600 may further include an output interface 640.

Herein, the processor 610 may control the output interface 640 to communicate with other devices or chip, specifically outputting information or data sent by other devices or chips.

It is to be understood that the chip 600 may be applied to the network device in the embodiment of the present disclosure, and the chip may implement corresponding flows implemented by the network device in each method of the embodiments of the present disclosure, and may also implement corresponding flows implemented by the terminal device in each method of the embodiments of the present disclosure. For simplicity, elaborations are omitted herein.

It is to be understood that various components in the chip 600 are connected through a bus system. Herein, in addition to a data bus, the bus system further includes a power bus, a control bus, and a status signal bus.

The processor referred to above may include, but is not limited to:

a universal processor, a Digital Signal Processor (DSP), an Application Specific Integrated Circuit (ASIC), a Field Programmable Gate Array (FPGA) or another programmable logical device, discrete gate or transistor logical device and discrete hardware component.

The processor may be configured to implement or execute each method, step and logical block diagram disclosed in the embodiments of the present disclosure. The steps of the method disclosed in combination with the embodiments of the present disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in a memory, and the processor reads information in the memory, and completes the steps of the method in combination with hardware.

The memory referred to above may include, but is not limited to:

a volatile memory and/or a nonvolatile memory. Herein, the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM).

It is to be noted that the memory described herein is intended to include, but not limited to, memories of these and any other proper types.

The embodiments of the present disclosure also provide a computer-readable storage medium, which is configured to store a computer program. The computer-readable storage medium stores one or more programs including instructions. When executed by a portable electronic device including multiple application programs, the instructions enable the portable electronic device to execute the method of the embodiment shown by the method 200.

Optionally, the computer-readable storage medium may be applied to a network device in the embodiments of the present disclosure, and the computer program enables a computer to execute corresponding flows implemented by the network device in each method of the embodiments of the present disclosure. For simplicity, elaborations are omitted herein.

Optionally, the computer-readable storage medium may be applied to a mobile terminal/terminal device in the embodiments of the present disclosure, and the computer program enables a computer to execute corresponding flows implemented by the mobile terminal/terminal device in each method of the embodiments of the present disclosure. For simplicity, elaborations are omitted herein.

The embodiments of the present disclosure also provide a computer program product, which includes a computer program.

Optionally, the computer program product may be applied to a network device in the embodiments of the present disclosure, and the computer program enables a computer to execute corresponding flows implemented by the network device in each method of the embodiments of the present disclosure. For simplicity, elaborations are omitted herein.

Optionally, the computer program product may be applied to a mobile terminal/terminal device in the embodiments of the present disclosure, and the computer program instruction enables the computer to execute corresponding flows implemented by the mobile terminal/terminal device in each method of the embodiments of the present disclosure. For simplicity, elaborations are omitted herein.

The embodiments of the present disclosure also provide a computer program. When the computer program is executed by the computer, the computer may execute the method of the embodiment shown in the method 200.

Optionally, the computer program may be applied to a network device in the embodiments of the present disclosure, and the computer program runs in a computer to enable the computer to execute corresponding flows implemented by the network device in each method of the embodiments of the present disclosure. For simplicity, elaborations are omitted herein.

In addition, the embodiments of the present disclosure further provide a communication system, which may include the above terminal device and network device to form a communication system 100 shown in FIG. 1. For simplicity, elaborations are omitted herein. It is to be noted that the terms "system" and the like herein may also be referred to as "network management architecture" or "network system" and the like.

It is also to be understood that the terms used in the embodiments and the appended claims of the present disclosure are only for describing the specific embodiments and are not intended to limit the embodiments of the present disclosure.

For example, singular forms "a/an", "said", "above" and "the" used in the embodiments and appended claims of the present disclosure are also intended to include plural forms unless other meanings are clearly expressed in the context.

Those skilled in the art may realize that the units and algorithm steps of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the embodiments of the present disclosure.

When being realized in form of software functional unit and sold or used as an independent product, the function may also be stored in a computer-readable storage medium. Based on such an understanding, the technical solutions of the embodiments of the present disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the steps of the method in each embodiment of the present disclosure. The aforementioned storage medium includes: various media capable of storing program codes such as a U disk, a mobile hard disk, a ROM, a RAM, a magnetic disk or an optical disk.

Those skilled in the art may clearly learn about that specific working processes of the system, device and unit described above may refer to the corresponding processes in the method embodiments and will not be elaborated herein for convenient and brief description.

In some embodiments provided by the present disclosure, it is to be understood that the disclosed system, device and method may be implemented in another manner.

For example, division of the units or modules or components in the device embodiments described above is only logic function division, and other division manners may be adopted during practical implementation. For example, multiple units or components may be combined or integrated into another system, or some units or modules or components may be neglected or not executed.

For another example, the units/modules/components described as separate/display parts may or may not be physically separated, and namely may be located in the same place, or may also be distributed to multiple network units. Part of all of the units/modules/components may be selected according to a practical requirement to achieve the purposes of the embodiments of the present disclosure.

Finally, it is to be noted that, coupling or direct coupling or communication connection between each displayed or discussed component may be indirect coupling or communication connection, implemented through some interfaces, of the device or the units, and may be electrical and mechanical or adopt other forms.

The above is only the specific implementation mode of the embodiments of the present disclosure and not intended to limit the scope of protection of the embodiments of the present disclosure. Any variations or replacements apparent to those skilled in the art within the technical scope disclosed by the embodiments of the present disclosure shall fall within the scope of protection of the present disclosure. Therefore, the scope of protection of the embodiments of the present disclosure shall be subject to the scope of protection of the claims.

The invention claimed is:

1. A wireless communication method, comprising:
   receiving, by a terminal device, an indication signal, the indication signal being configured to indicate whether the terminal device receives a paging message;

wherein the indication signal is a Physical Downlink Control Channel (PDCCH);
wherein the indication signal comprises N*M bits;
wherein the method further comprises:
obtaining, by the terminal device, a second mapping relationship and a third mapping relationship;
the second mapping relationship comprises at least one of:
correspondences between M bit groups and at least one paging frame, the at least one paging frame comprising a paging frame corresponding to the paging message of the terminal device; and
correspondences between the M bit groups and at least one Paging Occasion (PO), the at least one PO comprising a PO corresponding to the paging message of the terminal device;
each of the M bit groups comprises consecutive N bits;
the third mapping relationship comprises at least one of:
correspondences between the N bits and N terminal Identifiers (IDs), the N terminal IDs comprising an ID of the terminal device;
correspondences between the N bits and N terminal group IDs, the N terminal group IDs comprising a group ID of the terminal device; and
correspondences between the N bits and N POs, the N POs comprising the PO corresponding to the paging message of the terminal device.

2. The method of claim 1, further comprising:
determining, by the terminal device, a bit group corresponding to the terminal device from the M bit groups based on the second mapping relationship and at least one of the following information of the terminal device:
the PO corresponding to the paging message or the paging frame; and
determining, by the terminal device, a value of a bit corresponding to the terminal device from the bit group corresponding to the terminal device based on the third mapping relationship and at least one of the following information of the terminal device:
the ID or the group ID,
determining, by the terminal device, whether to receive the paging message of the terminal device based on the value of the bit corresponding to the terminal device.

3. The method of claim 1, wherein the second mapping relationship or the third mapping relationship is preset, or the second mapping relationship or the third mapping relationship is notified by signaling received by the terminal device.

4. The method of claim 1, wherein a number of bits of the indication signal is preset; or the number of bits of the indication signal is notified by signaling received by the terminal device.

5. The method of claim 1, wherein the group ID of the terminal device is a numerical value determined based on the ID of the terminal device,
wherein the group ID of the terminal device is a numerical value determined by taking a modulo of the ID of the terminal device based on a first threshold, the first threshold is a total number of group IDs.

6. The method of claim 1, wherein receiving, by the terminal device, the indication signal comprises:
receiving, by the terminal device, the indication signal based on a first timing relationship, the first timing relationship comprising a timing relationship between a first time position and at least one PO, the first time position being a time position at which the terminal device receives the indication signal, and the at least one PO being the PO corresponding to the paging message of the terminal device.

7. The method of claim 6, wherein the first timing relationship comprises at least one of:
a first time interval or a range of the first time interval, the first time interval being a time interval between the first time position and the at least one PO; or
a number of the at least one PO,
wherein the first time interval is a time interval between the first time position and a first PO of the at least one PO.

8. The method of claim 6, wherein the first timing relationship is preset, or the first timing relationship is notified by signaling received by the terminal device.

9. The method of claim 1, wherein an antenna port used by the indication signal and an antenna port used by a Demodulation Reference Signal (DMRS) of the indication signal are respectively the same as an antenna port used by at least one of:
a Primary Synchronization Signal (PSS), a Secondary Synchronization Signal (SSS), and a Physical broadcast channel (PBCH) DMRS.

10. The method of claim 1, wherein a Radio Resource Control (RRC) connection of the terminal device is in an idle state or an inactive state.

11. A wireless communication method, comprising:
sending, by a network device, an indication signal, the indication signal being configured to indicate whether a terminal device receives a paging message;
wherein the indication signal is a Physical Downlink Control Channel (PDCCH);
wherein the indication signal comprises N*M bits,
wherein the method further comprises:
obtaining, by the network device, a second mapping relationship and a third mapping relationship;
the second mapping relationship comprises at least one of:
correspondences between M bit groups and at least one paging frame, the at least one paging frame comprising a paging frame corresponding to the paging message of the terminal device; and
correspondences between the M bit groups and at least one Paging Occasion (PO), the at least one PO comprising a PO corresponding to the paging message of the terminal device;
each of the M bit groups comprises consecutive N bits;
the third mapping relationship comprises at least one of:
correspondences between the N bits and N terminal Identifiers (IDs), the N terminal IDs comprising an ID of the terminal device;
correspondences between the N bits and N terminal group IDs, the N terminal group IDs comprising a group ID of the terminal device; and
correspondences between the N bits and N POs, the N POs comprising the PO corresponding to the paging message of the terminal device.

12. The method of claim 11, further comprising:
determining, by the network device, a bit group corresponding to the terminal device from the M bit groups based on the second mapping relationship and at least one of the following information of the terminal device:
the PO corresponding to the paging message or the paging frame; and
determining, by the network device, a value of a bit corresponding to the terminal device from the bit group corresponding to the terminal device based on the third mapping relationship and at least one of the following information of the terminal device:
the ID or the group ID,
wherein the value of the bit corresponding to the terminal device is configured to indicate whether the terminal device receives the paging message.

13. The method of claim 11, wherein the second mapping relationship or the third mapping relationship is preset.

14. The method of claim 11, wherein a number of bits of the indication signal is preset; or the number of bits of the indication signal is notified by signaling received by the terminal device.

15. The method of claim 11, wherein the group ID of the terminal device is a numerical value determined based on the ID of the terminal device,
wherein the group ID of the terminal device is a numerical value determined by taking a modulo of the ID of the terminal device based on a first threshold, the first threshold is a total number of group IDs.

16. The method of claim 11, wherein sending, by the network device, the indication signal comprises:
sending, by the network device, the indication signal based on a first timing relationship, the first timing relationship comprising a timing relationship between a first time position and at least one PO, the first time position being a time position at which the terminal device receives the indication signal, and the at least one PO being the PO corresponding to the paging message of the terminal device.

17. The method of claim 16, wherein the first timing relationship comprises at least one of:
a first time interval or a range of the first time interval, the first time interval being a time interval between the first time position and the at least one PO; or
a number of the at least one PO,
wherein the first time interval is a time interval between the first time position and a first PO of the at least one PO.

18. The method of claim 16, wherein the first timing relationship is preset.

19. A terminal device, comprising:
a transceiver, configured to receive an indication signal, the indication signal being configured to indicate whether the terminal device receives a paging message;
wherein the indication signal is a Physical Downlink Control Channel (PDCCH);
wherein the indication signal comprises N*M bits;
wherein the transceiver is further configured to:
obtain a second mapping relationship and a third mapping relationship;
the second mapping relationship comprises at least one of:
correspondences between M bit groups and at least one paging frame, the at least one paging frame comprising a paging frame corresponding to the paging message of the terminal device; and
correspondences between the M bit groups and at least one Paging Occasion (PO), the at least one PO comprising a PO corresponding to the paging message of the terminal device;
each of the M bit groups comprises consecutive N bits;
the third mapping relationship comprises at least one of:
correspondences between the N bits and N terminal Identifiers (IDs), the N terminal IDs comprising an ID of the terminal device;
correspondences between the N bits and N terminal group IDs, the N terminal group IDs comprising a group ID of the terminal device; and
correspondences between the N bits and N POs, the N POs comprising the PO corresponding to the paging message of the terminal device.

20. A network device, comprising:
a transceiver, configured to send an indication signal, the indication signal being configured to indicate whether the terminal device receives a paging message;
wherein the indication signal is a Physical Downlink Control Channel (PDCCH);
wherein the indication signal comprises N*M bits,
wherein the transceiver is further configured to:
obtain a second mapping relationship and a third mapping relationship;
the second mapping relationship comprises at least one of:
correspondences between M bit groups and at least one paging frame, the at least one paging frame comprising a paging frame corresponding to the paging message of the terminal device; and
correspondences between the M bit groups and at least one Paging Occasion (PO), the at least one PO comprising a PO corresponding to the paging message of the terminal device;
each of the M bit groups comprises consecutive N bits;
the third mapping relationship comprises at least one of:
correspondences between the N bits and N terminal Identifiers (IDs), the N terminal IDs comprising an ID of the terminal device;
correspondences between the N bits and N terminal group IDs, the N terminal group IDs comprising a group ID of the terminal device; and
correspondences between the N bits and N POs, the N POs comprising the PO corresponding to the paging message of the terminal device.

* * * * *